COLOR-IMAGE-REPRODUCING APPARATUS OF THE PROJECTION TYPE

Filed May 14, 1954 5 Sheets-Sheet 1

June 26, 1956 W. F. BAILEY 2,752,419

COLOR-IMAGE-REPRODUCING APPARATUS OF THE PROJECTION TYPE

Filed May 14, 1954 5 Sheets-Sheet 2

June 26, 1956 W. F. BAILEY 2,752,419

COLOR-IMAGE-REPRODUCING APPARATUS OF THE PROJECTION TYPE

Filed May 14, 1954 5 Sheets-Sheet 3

June 26, 1956 W. F. BAILEY 2,752,419

COLOR-IMAGE-REPRODUCING APPARATUS OF THE PROJECTION TYPE

Filed May 14, 1954 5 Sheets-Sheet 4

June 26, 1956 W. F. BAILEY 2,752,419

COLOR-IMAGE-REPRODUCING APPARATUS OF THE PROJECTION TYPE

Filed May 14, 1954 5 Sheets-Sheet 5

United States Patent Office 2,752,419

Patented June 26, 1956

2,752,419

COLOR-IMAGE-REPRODUCING APPARATUS OF THE PROJECTION TYPE

William F. Bailey, Valley Stream, N. Y., assignor to Hazeltine Research, Inc., Chicago, Ill., a corporation of Illinois Application May 14, 1954, Serial No. 429,941

17 Claims. (Cl. 178—5.4)

This invention relates to electromechanical color-image-reproducing apparatus of the projection type and, more particularly, to such apparatus of the type which displays component color images on a screen and is subject to temperature variations which tend to degrade the image register.

Color-image-reproducing apparatus of the projection type heretofore proposed, in general, have been subject to limitations which render the apparatus unsuitable for certain applications, for example, home color-television receivers. In this connection, color-image-reproducing apparatus of the projection type which displays component color images on a screen must be capable of maintaining the images in register over an extended period of time and over a reasonable range of operating conditions normally encountered in such applications. The problems involved in maintaining such image register have caused leaders in the electronic field to hold the common opinion that color-television receivers of the projection type are entirely impractical for home use. Any considerable degradation of register is extremely undesirable, since it ordinarily causes objectionable color distortion in the composite image reproduced at the display screen.

To the best of our knowledge, no one has heretofore appreciated that the normal random temperature variations of such projection-type color-image-reproducing apparatus are of sufficient magnitude to be a serious factor in causing degradation of the register. This is especially true as regards movements of the focus coils caused by thermal expansions and contractions since such movements bring into play certain complex beam movements peculiar to the electron optics of focus coils.

It is an object of the present invention, therefore, to provide a new and improved electromechanical color-image-reproducing apparatus of the projection type which avoids one or more of the above-mentioned disadvantages of such apparatus heretofore proposed.

It is another object of the invention to provide a new and improved electromechanical color-image-reproducing apparatus of the projection type which is suitable for use in a home color-television receiver.

It is another object of the invention to provide a new and improved electromechanical color-image-reproducing apparatus of the projection type which is capable of maintaining register of images developed by cathode-ray image-reproducing tubes associated therewith notwithstanding normal temperature variations.

In accordance with a particular form of the invention, in a color-television receiver including circuit means for supplying signals representative of the intensities of predetermined primary colors of a color image to be reproduced, circuit means for supplying scanning signals, and an image-display screen, electromechanical color-image-reproducing apparatus of the projection type for displaying on the screen component color images and subject to temperature variations which tend to degrade the image register comprises a support and a plurality of cathode-ray tube optical units mounted on the support. The cathode-ray units include a plurality of beam-control devices individual thereto and are responsive jointly to the color-representative signals and the scanning signals for developing and projecting component color images individually representative of predetermined primary colors of a color image to be reproduced. The apparatus also includes optical means mounted on the support for translating the component color images to the display screen in register. The beam-control devices are subject to undesirable dimensional variations due to temperature variations of the apparatus and are so positioned on the cathode-ray units as to cause temperature variations to shift the scanning rasters of the units in the same direction as projected on the display screen, thereby substantially to reduce any image-register degradation on the display screen due to temperature variations.

For a better understanding of the present invention, together with other and further objects thereof, reference is had to the following description taken in connection with the accompanying drawings, and its scope will be pointed out in the appended claims.

Referring to the drawings.

Figures 6A, 6B:
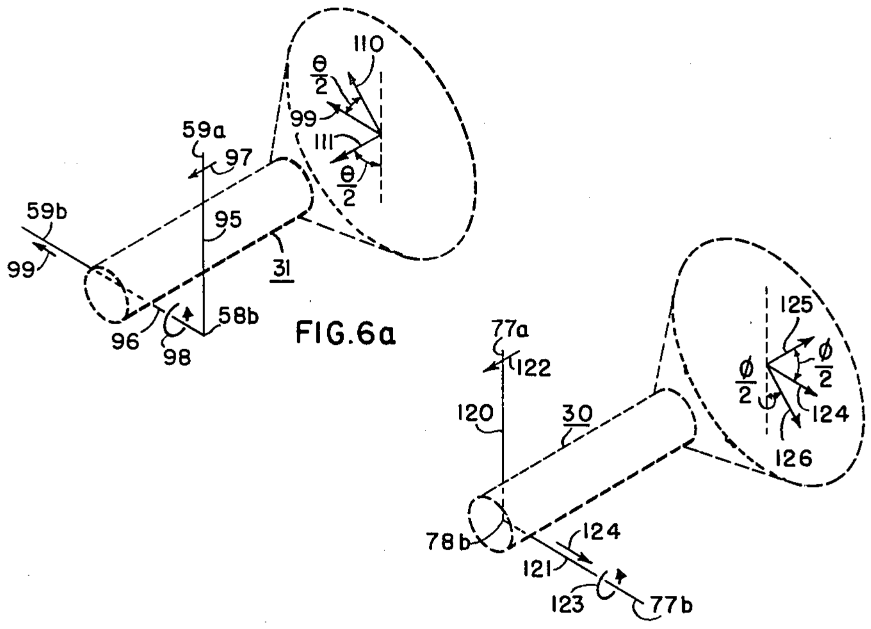
Figure 2:
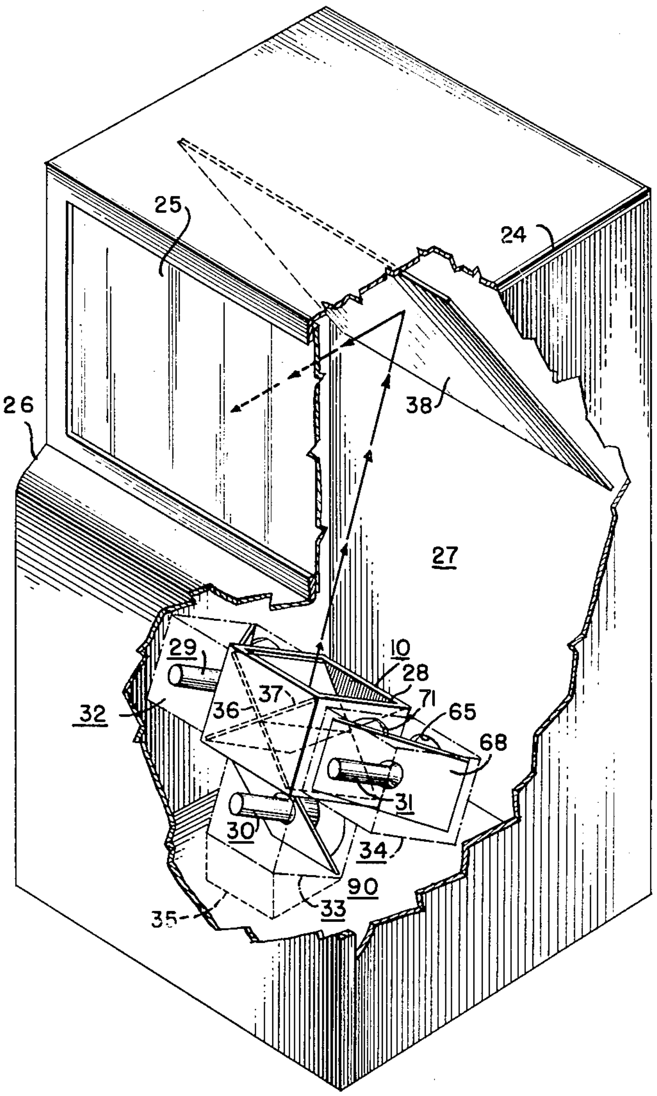
Fig. 2 is a perspective view, partly diagrammatic, of a color-image-reproducing apparatus embodying the invention positioned in a suitable cabinet.
Figure 3A:
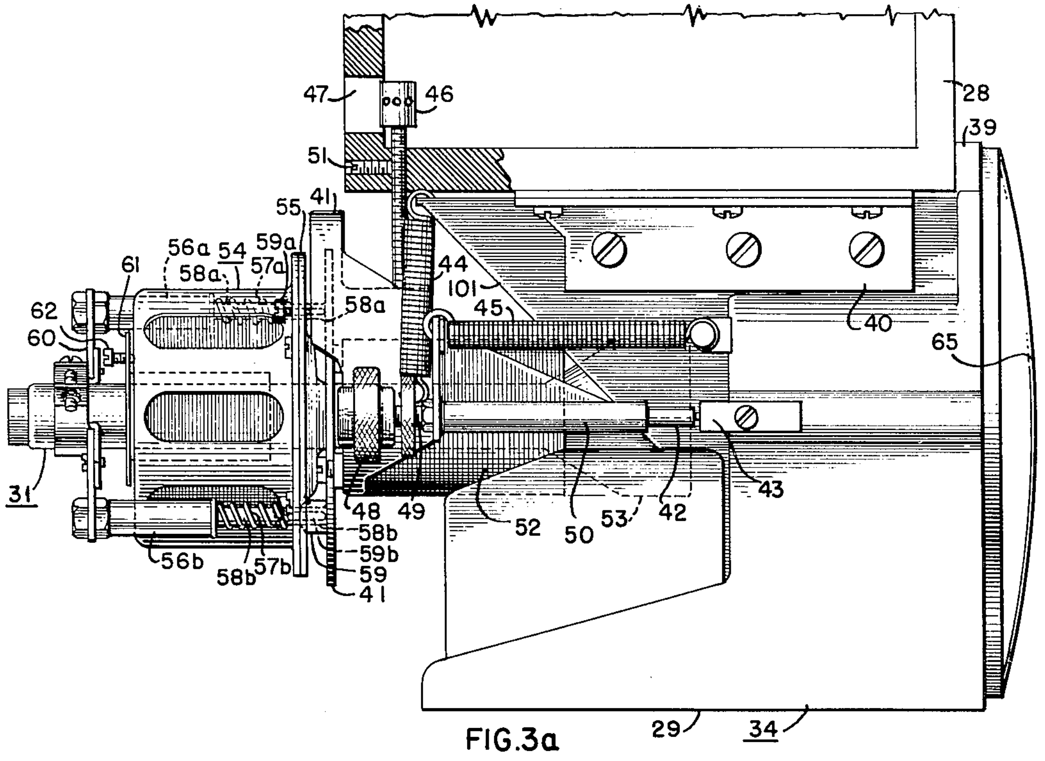
Figure 3B:
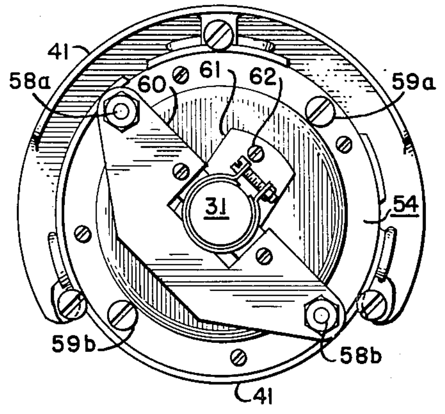
Figure 4:
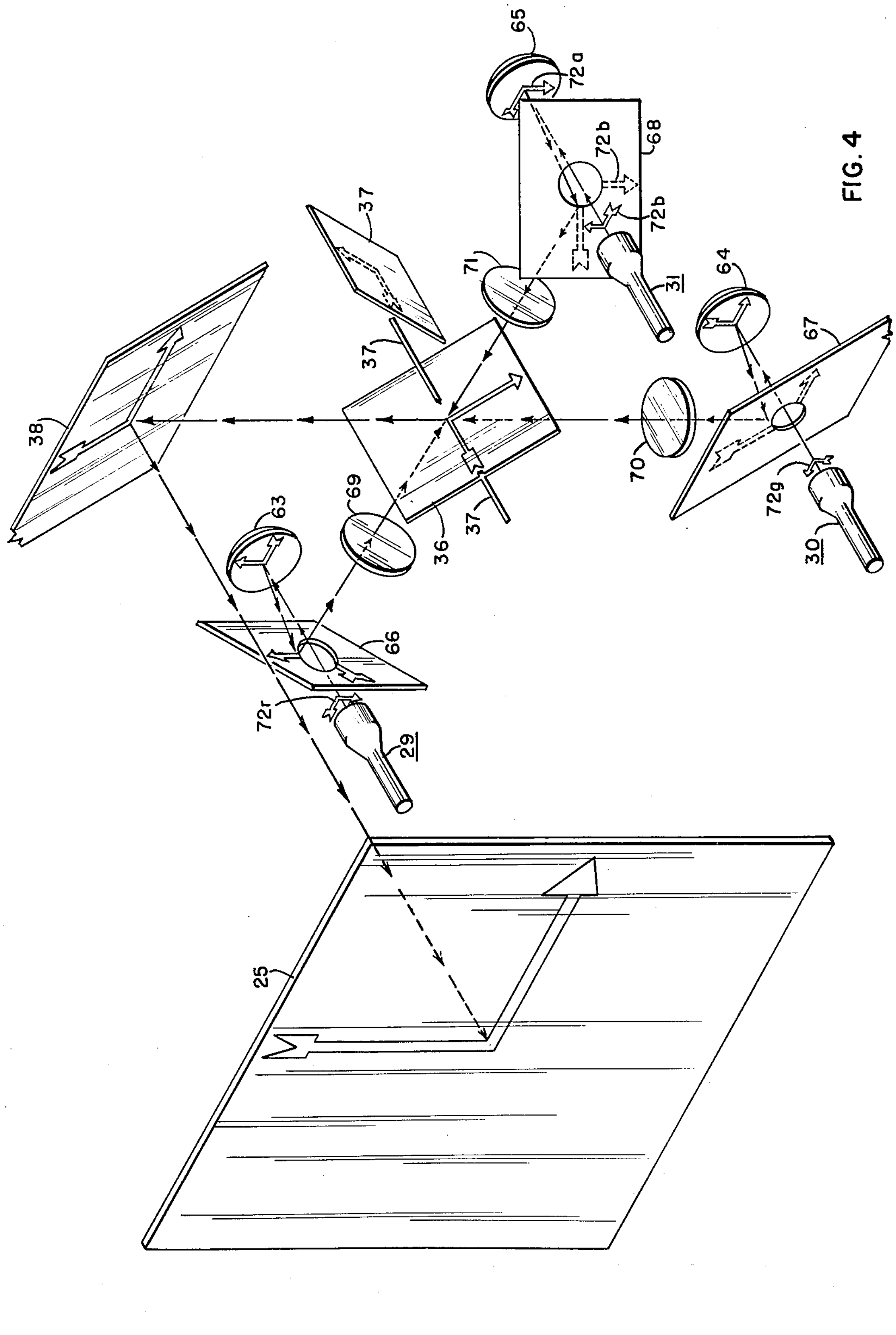
Figure 5A:
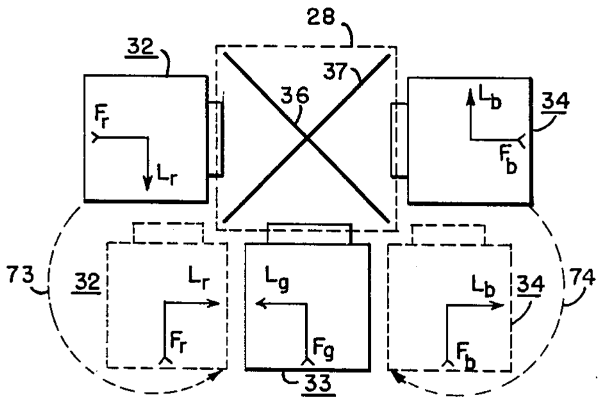
Figure 5B:
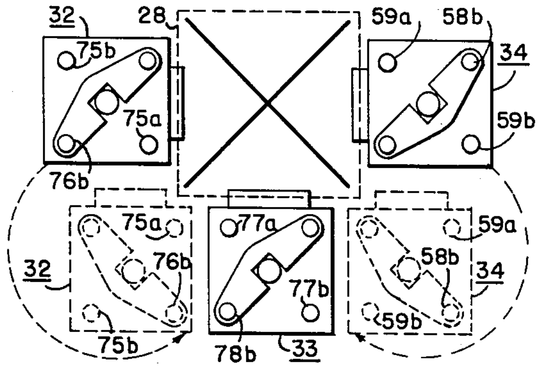

Fig. 3*a* is a top view of an optical unit of the apparatus represented in Fig. 2;

Fig. 3*b* is an end view of a portion of the optical unit of Fig. 3*a*;

Fig. 4 is an exploded perspective representation of the Fig. 2 color-image-reproducing apparatus to aid in explaining the operation thereof;

Fig. 5*b* is a diagrammatic representation of a portion of the Fig. 2 color-image-reproducing apparatus constructed in accordance with the invention;

Figs. 5*a*, 5*c*, 5*d*, and 5*e* are diagrams to aid in explaining the operation of the Fig. 5*b* apparatus, and Figs. 6*a* and 6*b* are diagrams which aid in explaining the operation of the Fig. 5*b* apparatus.

Figure 1:
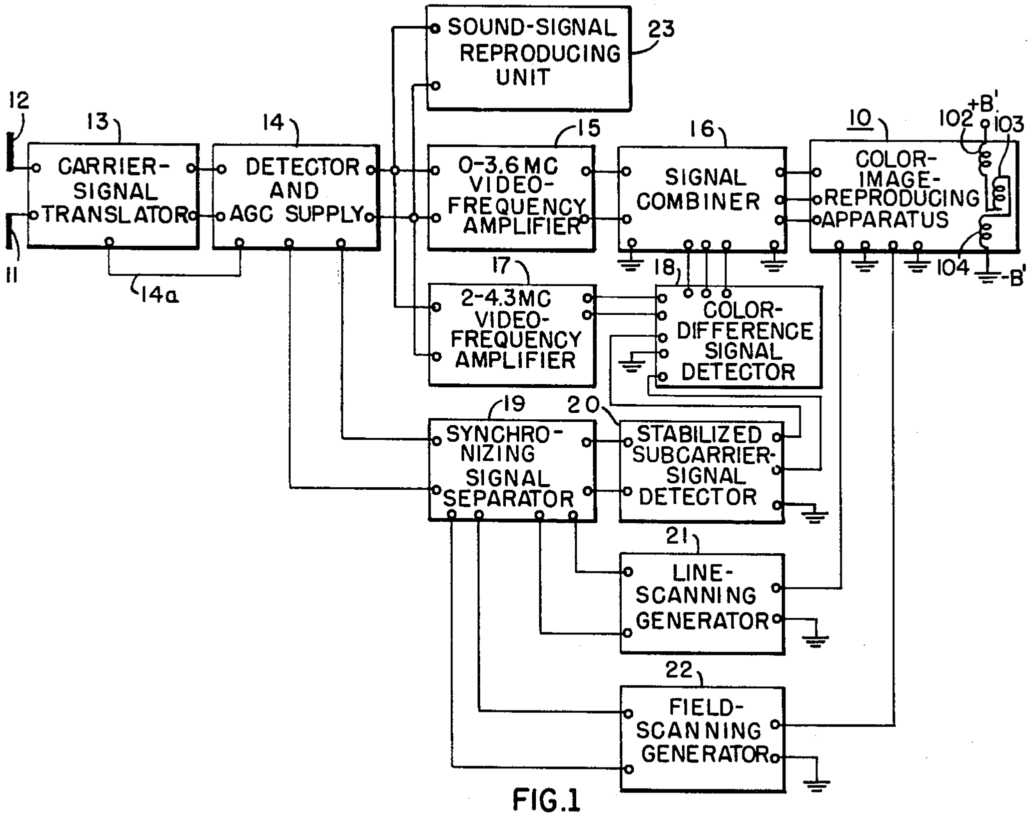
Fig. 1 is a schematic circuit diagram of a complete color-television receiver including electromechanical color-image-reproducing apparatus constructed in accordance with the invention.

*General description of Fig. 1 color-television receiver*

Referring now more particularly to Fig. 1 of the drawings, there is represented a color-television receiver including color-image-reproducing apparatus 10 of the projection type, constructed in accordance with the invention and more fully described hereinafter. With the exception of the image-reproducing apparatus 10, the receiver may be of a conventional type, for example, of a constant-luminance type described and claimed in the copending application of Bernard D. Loughlin, Serial No. 159,212, filed May 1, 1950, and entitled "Color-Television System." Receivers of this type are further described in the October 1951 issue of the Proceedings of the IRE in an article entitled "Recent improvements in band-shared simultaneous color-television systems" by Loughlin, and in an article by Hirsch, Bailey, and Loughlin entitled "Principles of NTSC compatible color television," Electronics, February 1952.

The Fig. 1 receiver includes an antenna system 11, 12, a carrier-signal translator 13 which may be of the conventional superheterodyne type, and a detector and automatic-gain-control or (AGC) supply 14, coupled in cascade and in the order named, for receiving a wave signal modulated by a composite color video-frequency signal and for deriving the latter signal therefrom. The AGC supply of unit 14 is coupled to the input circuit of one or more stages of unit 13 by a control-circuit conductor 14*a*.

There is connected to the detector and AGC supply 14 a video-frequency amplifier 15 for translating at least the low-frequency portion of the video-frequency signal, and preferably the frequency band of 0–3.6 megacycles comprising the monochrome-signal component capable of reproducing an image substantially of the type normally reproduced in a conventional monochrome or black-and-white receiver and, thus, representative of the brightness and detail of the image. The output circuit of the video-frequency amplifier 15 is connected to an input circuit of a signal combiner 16 of a conventional type which may comprise, for example, three adders having individual input circuits coupled to the amplifier 15.

There is also connected to the output circuit of the detector of the unit 14 a signal-translating channel responsive to the modulated subcarrier signal component of the video-frequency signal derived by the detector for supplying three color-difference signals. This channel includes a video-frequency amplifier 17 having a pass band of, for example, 2–4.3 megacycles and a color-difference signal detector 18 coupled thereto and preferably comprising a matrixing system for deriving color-difference signals which, relative to the luminance signal, represent the chromaticity or color quality of an image definable by its dominant wave length and its purity taken together. The matrixing system of the detector 18 preferably is proportioned in accordance with the teaching of the above-mentioned Loughlin application to impart a constant-luminance characteristic to the receiver.

The color-difference signal detector 18 has three output circuits individually connected to the input circuits of the three adders of the signal combiner 16 for supplying the color-difference signals thereto for combination with the monochrome signal to develop three color signals individually representative of predetermined primary colors of the color image to be reproduced. The three output circuits of the signal combiner 16 are individually connected to cathode-ray image-reproducing devices of the apparatus 10, as will be more fully described subsequently.

The term "predetermined primary color," as used herein and in the appended claims with reference to a color image, is defined by predetermined dominant wave length and purity factors and by a variable intensity factor determined by the image. Further, the primary colors individually represent distinct and widely spaced regions of the visible spectrum. No primary color of a selected set of, for example, three primary colors can be matched by a combination of any other primary colors of the set.

The receiver also includes a synchronizing-signal separator 19 for deriving the subcarrier synchronizing signal and line-synchronizing and field-synchronizing signals from the video-frequency signals applied thereto by the unit 14. One output circuit of the synchronizing-signal separator 19 is coupled to a stabilized subcarrier signal generator 20 of conventional phase-controlled oscillator design having a pair of output circuits connected to the input circuits of the color-difference signal detector 18 for providing a pair of phase-displaced unmodulated subcarrier signals, for example, signals in phase-quadrature, for individually beating with the modulated subcarrier signal component applied to the color-difference signal detector by the amplifier 17 to derive in the detector 18 the color-difference signals. The receiver also includes line-scanning and field-scanning generators 21 and 22, respectively, connected in a conventional manner to the scanning circuits of the image-reproducing apparatus 10 for effecting synchronous scanning of the individual cathode-ray tubes thereof.

The television receiver also includes a sound-signal reproducing unit 23 of conventional construction connected to the detector of the unit 14 and comprising the usual sound intermediate-frequency amplifier, frequency-modulation detector, audio-frequency amplifier, and loudspeaker.

*Operation of Fig. 1 color-television receiver*

Considering briefly the operation of the Fig. 1 receiver as a whole, a modulated color-television wave signal intercepted by the antenna system 11, 12 is selected by the carrier-signal translator 13 which amplifies and converts the same to an intermediate-frequency signal and supplies that signal to the detector of the unit 14. The detector of unit 14 derives the modulation components comprising a video-frequency signal having a luminance component comprising frequency components in a band of, for example, 0–3.6 megacycles. The video-frequency signal is translated through the video-frequency amplifier 15 to the signal combiner 16 for combination with color-difference signals supplied thereto in a manner more fully explained hereinafter.

For the purpose of developing color images in the color-image-reproducing apparatus 10, a modulated subcarrier signal component in the frequency band of 2–4.3 megacycles of the video-frequency signal derived by the detector of the unit 14 is translated through the video-frequency amplifier 17 and applied to the color-difference signal detector 18. The quadrature-phase subcarrier output signals of the stabilized subcarrier signal generator 20 beat with the modulated subcarrier signal component applied to the color-difference signal detector to develop in the individual output circuits thereof, for example, red, green, and blue color-difference signals individually including approximately 0–2 megacycle frequency bands and comprising the modulation components of the modulated subcarrier signal component and representing, relative to the luminance component, chromaticity components of the composite color image to be reproduced. The red, green, and blue color-difference signals then effectively are individually combined in the signal combiner 16 with the luminance component applied thereto to provide, for example, red, green, and blue color signals individually representative of the intensities of predetermined primary colors of the image to be reproduced, which are applied to the apparatus 10 in a conventional manner.

The synchronizing-signal components of the video-frequency signal developed in the output circuit of the unit 14 are separated from the luminance and color-difference signal components by the separator 19 and are applied to the line-scanning and field-scanning generators 21 and 22 to synchronize the operation thereof. These generators preferably supply signals of saw-tooth wave form for application to the deflection circuits of the color-image-reproducing apparatus 10 to control the line-scanning and field-scanning operations thereof. The synchronizing-signal separator 19 also derives a synchronizing signal comprising, for example, several cycles of an unmodulated subcarrier reference signal for controlling the phases of the output signals of the generator 20 in a conventional manner.

The automatic-gain-control or AGC signal derived in unit 14 is effective to control the amplification of one or more stages of the unit 13 to maintain the signal input to the detector of the unit 14 within a relatively narrow range for a wide range of received signal intensities.

In accordance with the operating principles of an intercarrier television receiver, the sound intermediate-frequency signal supplied by the carrier-signal translator 13 beats in the detector of the unit 14 with the picture intermediate-frequency signal to derive a second sound intermediate-frequency signal in the detector output circuit. This sound intermediate-frequency signal is amplified in the unit 23 and the audio-frequency modulation components thereof are derived and converted into sound in a conventional manner.

*Description of Fig. 2 color-image-reproducing apparatus*

Referring now more particularly to Fig. 2, there is represented color-image-reproducing apparatus 10 constructed in accordance with the invention and positioned in a suitable upright cabinet 24. The cabinet 24 preferably includes a display screen 25, for example, a translucent sheet having desirable light-distribution characteristics, and a removable front cover 26 enclosing a chamber 27 for housing the apparatus 10.

The color-image-reproducing apparatus 10 preferably comprises a support 90 including a hollow, right-parallelepiped box 28 to which there are attached a plurality of cathode-ray tubes 29, 30, and 31, preferably mounted on three surfaces of the box 28 by means of optical units 32, 33, 34, represented in broken-line construction and preferably including lens means more fully described subsequently. The support 90 may, for example, be attached to the bottom of the cabinet 24 by a suitable supporting member 35, represented in broken-line construction.

The color-image-reproducing apparatus 10 also includes optical means mounted on the support 90 for translating component color images to the display screen 25 in register. This optical means preferably includes a pair of intersecting plane dichroic mirrors 36, 37 disposed perpendicular to each other within the box 28 and having substantially a 45° angular relation to the mean directions of light projected thereto from the cathode-ray devices 29–31, inclusive. The optical means preferably also includes a plane mirror 38 supported from the cabinet 24 and angularly disposed with respect to the display screen 25 for directing light from the units 32, 33, and 34 to the display screen 25.

The box 28, the dichroic mirrors 36, 37 disposed therein, and the three units 32, 33, 34 supporting the cathode-ray tubes 29, 30, 31, respectively, preferably comprise a rigid unitary structure of the type described and claimed in the copending application of William F. Bailey and Robert P. Burr, Serial No. 423,745, filed April 16, 1954, and entitled "Optical Structure for Color-Image-Reproducing Apparatus of the Projection Type." The cabinet 24 and the electro-optical means disposed therein preferably comprise a structure of the type described and claimed in the copending application of Robert P. Burr and Raymond J. Keogh, Serial No. 423,746, filed April 16, 1954, and entitled "Color-Image-Reproducing Apparatus."

Referring now more particularly to Figs. 3*a* and 3*b*, the unit 34 may, for example, be similar to a conventional type of projection optical unit, such as that manufactured and sold by the North American Philips Co., under the name "Protelgram System." A system of the "Protelgram" type is described in an article entitled "Home projection television part 1 cathode-ray tube and optical system" by Rinia, de Gier, and van Alphen, Proceedings of the IRE, March 1948. The unit 34 of Figs. 3*a* and 3*b* comprises, for example, a suitable metal frame or housing 39 attached to the box 28 by a bracket 40. There is adjustably mounted on the housing 39 a support 41 for the cathode-ray tube 31. A control knob 48 is provided for adjusting the position of support 41 by adjustment of a threaded screw 49 extending through a sleeve 50 affixed to the support 41 and having a tip 42 disposed in a socket 43 on the housing 39. A similar knob, thread screw and sleeve structure, and screw-tip and socket structure on the side of the unit 34 concealed from view and parallel to the knob 48, screw 49, sleeve 50, screw-tip 42, and socket 43 are attached to the support 41 and housing 39 in an identical manner to elements shown. Thus, the support 41 is pivotally mounted on the frame 39 by the tip 42 of the screw 49 disposed in socket 43 and corresponding screw-tip and socket structure on the side of the unit 34 concealed from view and is maintained in position by springs 44 and 45 and springs on the side of the unit 34 concealed from view and adjustable cap screw 46 mounted in the box 28 and accessible through an aperture 47 therein. A suitable lock screw 51 for the screw 46 is threaded in a bore in box 28. The springs 44 and 45 and screw 49 and the corresponding springs and screw concealed from view conjointly control displacement of the support 41 in the plane of the drawing and parallel to the longitudinal axis of cathode-ray tube 31 when the screws are adjusted in the same sense. When the screw 49 and corresponding screw concealed from view are adjusted in opposite senses, the longitudinal axis of the cathode-ray tube rotates out of the plane of the drawing. Springs 44 and 45 together with screw 46 control rotation of the support 41 about tip 42 and corresponding tip concealed from view in the plane of the drawing and perpendicular to the longitudinal axis of the tube 31. Thus, support 41 is universally positioned.

The unit 34 preferably also includes a spherical mirror 65 (also shown in Fig. 4) disposed opposite the cathode-ray tube face for condensing the light emitted thereby. The unit 34 also includes a plane mirror (not shown in Fig. 3*a*, but as 68 in Fig. 4) disposed at a 45° angle with respect to the longitudinal axis of the cathode-ray tube 31 along a mounting surface 101 of the frame 39 and having an aperture therein for the cathode-ray tube. As more clearly represented in Figs. 2 and 4, such plane mirror 68 is so positioned with respect to spherical mirror 65 as to direct light reflected thereby to an aspherical correction lens 71 mounted on the unit 34 and disposed in registry with an aperture in the box 28.

Referring again to Fig. 3*a*, there is also provided the usual electromagnetic deflection winding structure or yoke 52 attached to the support 41 and disposed about the neck of the cathode-ray tube 31 near the bulbous portion 53 thereof. The yoke 52 preferably includes an inner shell (not shown) suitable for supporting the bulbous portion 53 of the cathode-ray tube in a predetermined relation with the yoke 52. An electromagnetic beam-focus winding structure 54, including a housing and end or base plate 55 containing the beam-focus winding in axial alignment therewith, is slidably mounted on a pair of studs **58*a*, 58*b* affixed to support 41. Structure 54 is maintained in position by coil springs 57*a*, 57*b* disposed about the studs between spacers 56*a*, 56*b* and the base plate 55, by a suitable annular spacer 59 around stud 58*b* and disposed between the base plate 55 and the support 41, and by cap screws 59*a*, 59*b* bearing against support 41 and serving as adjustable studs for adjusting the position of the focus-winding structure 54 and its enclosed focus coil relative to support 41 and the cathode-ray tube 31. The spring 57*b* is a substantially stronger spring than the spring 57*a*. The screws 59*a*, 59*b* and the spacer 59 ordinarily have different active lengths between the base plate 55 and the support 41 and preferably are constructed of the same material to have the same temperature coefficient of expansion. The stud 58*b* preferably is closely fitted in spacer 59 which preferably has a semi-spherical portion disposed in a conical hole in the base plate 55 to prevent transverse motion of the plate 55 with respect to stud 58*b*. The stud 58*a* is more loosely fitted in a slot in the base plate 55 along an imaginary line joining the studs 58*a*, 58*b* to allow transverse thermal expansion of the focus-winding structure 54** along the line joining the studs.

Referring now more particularly to Fig. 3*b*, there is represented, in particular, the adjustable support 41 for the cathode-ray tube 31 and the focus-winding structure 54 maintained in position by studs **58*a* and 58*b* and by screws 59*a* and 59*b*. Since the base plate 55 is freely slidable along the stud 58*a*, the focus-winding structure 54 is effectively positioned at a distance from the support 41 determined by three mounting elements, screws 59*a*, 59*b*, and the spacer 59 surrounding stud 58*b*, these mounting elements being disposed at the vertices of a right triangle and including two elements, screws 59*a*, 59*b*, for adjusting the axis of the focus-winding structure 54 with respect to the cathode-ray tube 31** to position the image developed thereby.

As represented in Figs. 3*a* and 3*b*, a suitable clamping structure 60 supports the neck of the cathode-ray tube 31 while a magnetic shunt 61 comprising, for example, a suitable flanged steel cylinder, partially represented in broken-line construction, preferably is slidably disposed about the neck of the tube 31 and is adjustably positioned relative to the focus-winding structure 54 by means of an adjustable cap screw 62 threaded in the flange of the shunt. The magnetic shunt 61 preferably fits tightly within an axial aperture of the focus-winding structure 54 and may be gradually disengaged from a position of complete engagement with the structure by adjustment of the screw 62 to vary the internal air gap width of the focus-winding structure. Similar magnetic shunts may be employed in the three cathode-ray tube units 32, 33, 34 of Fig. 2 for imparting similar magnetic beam-control characteristics to the focus windings. These shunts preferably are constructed of the same material and have the same temperature coefficients of expansion so that temperature variations affect the gap widths and thus the beam-focus fields in a similar manner.

The other cathode-ray tubes 29, 30 represented in Fig. 2 individually have beam-control devices and mounting elements (not shown) identical with those for tube 31 except where otherwise noted. That is, they have structures similar to the focus-winding structure 54 of the tube 31 and have similar mounting elements. The cathode-ray tubes 29, 30, 31 are responsive jointly to the color-representative signals supplied by the signal combiner 16 of the Fig. 1 receiver and to the scanning signals supplied by the scanning generators 21 and 22 thereof for developing component color images individually representative of predetermined primary colors, for example, red, green, and blue components, respectively, of a color image to be reproduced. The term "component color images" in referring to images developed by the cathode-ray tubes is employed in its broad sense to designate light representative of images which may be out of focus or invisible to the eye, as well as visible sharply defined images.

The electromagnetic beam-focus windings 102, 103, 104 of the tubes 29, 30, 31, respectively, represented diagrammatically in unit 10 of Fig. 1 (and contained in structures like 54 in Figs. 3*a* and 3*b*), preferably are series-coupled across a source of beam-focus current +B', —B' for developing by means of winding 103 a first beam-focus magnetic field of predetermined polarity and for developing by means of windings 102, 104 two similar beam-focus magnetic fields of opposite polarity to the first field. The windings 102, 103, 104 and beam-focus current source preferably are connected in a manner similar to that described and claimed in the copending application of Arthur V. Loughren, Serial No. 422,434, filed April 12, 1954, and entitled "Color-Image-Reproducing Apparatus," now abandoned in favor of continuation-in-part application Serial No. 471,340.

The beam-control devices and, more particularly, the beam-focus windings of the cathode-ray tubes 29, 30, 31 or the groups of mounting elements therefor are subject to undesirable dimensional variations due to temperature variations of the apparatus and are so positioned as to cause temperature variations to shift the scanning rasters of the units in the same direction as projected on the display screen, thereby substantially to reduce any image-register degration on the display screen due to such temperature variations. Referring again to Figs. 3*a* and 3*b*, the groups of mounting elements there represented comprise a non-adjustable element 58*b*, 59, a first adjustable element 59*a* for primarily controlling the position of the component color image developed on the cathode-ray tube 31 along one direction of the scanning raster thereof, and a second adjustable element 59*b* for primarily controlling the image position along a normal direction of the scanning raster. The nonadjustable element 58*b*, 59 and the adjustable element 59*b* have relative positions which are reversed with respect to corresponding elements of the beam-focus winding structure of the cathode-ray tube 30 supported by unit 33 while the relative positions of elements 58*b*, 59 and 59*b* are the same as the relative positions of corresponding elements of the beam-focus winding structure of the tube 29 supported by unit 32, as will be more fully discussed subsequently.

*Operation and adjustment of Fig. 3a optical unit*

During the operation of the Fig. 2 apparatus, component color images developed by the cathode-ray tubes 29, 30, 31 are projected in a manner more fully explained hereinafter from the optical units 32, 33, 34 to the dichroic mirrors 37, 38 for reflection and translation through an aperture in the box 28 to the mirror 38 and then to the display screen 25 to provide a composite color image thereon when the apparatus is properly adjusted.

Referring now to Fig. 3*a*, to provide a component image on the display screen of the apparatus which is approximately in register with the other component images developed by the other cathode-ray tubes, the cap screw 46 in the box 28 may be adjusted to adjust the position of the support 41, cathode-ray tube 31, the focus-winding structure 54, and deflection winding structure 52 as a unit with respect to the spherical mirror 65 and lens of the box 28 in the plane of the drawing and perpendicular to the longitudinal axis of the tube 31. The control knob 48 and corresponding knob on the other side of the unit 34 (not shown) may also be adjusted to adjust the position of the support 41 and associated components relative to the box 28 in the plane of the drawing and parallel to the axis of the tube 31 by adjusting the screw 49 in the sleeve 50 and corresponding screw in sleeve on the other side of unit 34. By differential adjustment of the screw 49 and corresponding screw concealed from view, the support 41 may be positioned in and out of the plane of the drawing. The lock screw 51 may then be tightened against the screw 46 to maintain the same in position while suitable lock nuts may be employed to lock screw 49 and corresponding screw.

During these adjustments the clamp 60 may be loosened and the cathode-ray tube 31 may be moved slightly within the focus-winding structure 54 while the focus-winding structure 54 may be adjusted with respect to support 41 by adjusting screws 59*a* and 59*b*. The combination of adjustments provides an image raster on the tube face in register on the display screen with the image rasters developed by the other cathode-ray tubes. The magnetic shunt 61 may also be positioned relative to the focus-winding structure 54 by means of adjustable screw 62 for imparting a desired beam-control characteristic to the focus-winding structure similar to the beam-control characteristics of the focus-winding structures of the cathode-ray tube 29 and similar but of opposite polarity to that of cathode-ray tube 30. The adjustments are interrelated to some extent and it may, therefore, be necessary to repeat one or more steps until the desired focus and image register is obtained. Adjustment of a focus-current control (not shown) may also be necessary as explained in the aforesaid Loughren application.

*Operation of Fig. 2 color-image-reproducing apparatus*

The operation of the Fig. 2 color-image-reproducing apparatus may best be understood with reference to Fig. 4 which is a diagrammatic representation of various elements of the Fig. 2 apparatus. As represented in Fig. 4, there are associated with the cathode-ray tubes 29, 30, and 31 and disposed opposite their faces spherical mirrors 63, 64, 65, respectively, plane mirrors 66, 67, 68, respectively, disposed as shown, at 45° angles relative to the longitudinal axes of the cathode-ray tubes 29, 30, and 31, respectively, for directing light reflected from the spherical mirrors 63, 64, and 65 through correction lenses 69, 70, and 71, respectively, to dichroic mirrors 36, 37. A fragmentary portion of the mirror 37 is represented in proper position with respect to the mirror 36 and, for explanatory purposes, mirror 37 is also diagrammatically represented in a displaced, tilted position to provide a surface view thereof.

Referring now to the cathode-ray tube 31, the line-scanning direction thereof during visible trace time is represented by the direction of the head of a right angled arrow 72*b* while the field-scanning direction during visible trace time is represented by the direction of the tail of the arrow. The line-scanning and field-scanning directions thus represented are those directions as would be apparent to an observer of a rear view of the cathode-ray tube face. Assuming the arrow 72*b* represents a blue image component on the face of the cathode-ray tube, light representative of the arrow is projected through an aperture in the mirror 68 to the spherical mirror 65 which reverses the image both along the image lines thereof and normal to the image lines, as represented diagrammatically by the arrow 72*a* on the spherical mirror 65. Of course, light representative of the image ordinarily will not be in focus on the mirror 65 or the other mirrors in the color-image-reproducing apparatus and the arrow merely diagrammatically represents the reversals accomplished by the intermediate mirrors to develop the final image on the display screen 25.

Light reflected from the spherical mirror 65 is directed to the mirror 68 in the manner there represented by arrow 72*b* in broken-line construction to indicate that the image is developed on the far surface of the mirror. The mirror 68, in turn, reflects light representative of the image through the lens 71 to the dichroic mirrors 36, 37 where it is reflected from the mirror 36 to the mirror 38 and the display screen 25 in the manner represented in the drawing. Because of the relative positions of the mirrors 36 and 38 with respect to the mirror 68, light representative of a horizontal arrow tail on the mirror 68 develops a vertical arrow tail on the display screen 25, while light representative of a vertical arrowhead on the mirror 68 develops a horizontal arrowhead on the display screen 25.

A red image component, such as arrow 72*r*, developed by the cathode-ray tube 29 is projected to the display screen 25 by means of spherical mirror 63, plane mirror 66, lens 69, dichroic mirror 37, and plane mirror 38 in a manner similar to that just explained in connection with the blue cathode-ray tube 31. A green image component, such as arrow 72*g*, developed by the cathode-ray tube 30 is projected to the display screen 25 by means of spherical mirror 64, plane mirror 67, lens 70, and plane mirror 38. The projection of the green image component to the display screen differs from the projections of the red and blue images thereto in that the dichroic mirrors 36 and 37 both transmit light representative of the green image component without reflection thereof.

A comparison of the line-scanning and field-scanning directions of the cathode-ray tubes 29, 30, and 31 necessary to develop a composite image having red, green, and blue components in register on the display screen 25 may be readily made by reference to Fig. 5*a* which is a diagram representing the relative positions of the optical units 32, 33, 34 for the cathode-ray tubes 29, 30, 31, respectively, on the box 28 housing the dichroic mirrors 36, 37. The line-scanning directions and the field-scanning directions are represented by the arrowheads $L_r$, $L_g$, $L_b$ and arrow tails $F_r$, $F_g$, $F_b$, respectively, as directions which would be apparent to an observer of a rear view of the cathode-ray tube faces. These directions correspond to the directions indicated by the arrows 72*r*, 72*g*, 72*b* representing image components developed by the cathode-ray tubes of Fig. 4.

Units 32 and 34 are also represented in Fig. 5*a* in broken-line construction with 90° rotations, indicated by arrows 73, 74 in broken-line construction, to align corresponding line-scanning and field-scanning directions of the units 32, 33, 34 so that they may be compared. As indicated in Fig. 5*a*, the field-scanning directions of the cathode-ray tubes with respect to their respective units 32–34, inclusive, are the same, while the line-scanning directions of the red and blue cathode-ray tubes supported by units 32 and 34, respectively, are the same but differ from the line-scanning direction of the green cathode-ray tube supported by unit 33.

*Description of Fig. 5b apparatus*

Referring now to Fig. 5*b*, the box 28 is diagrammatically represented with units 32, 33, 34 attached thereto. As previously described in connection with Fig. 3*b*, the focus-winding structure 54 of the unit 34 is effectively positioned on the support thereof by adjustable mounting elements 59*a*, 59*b* and spacer 59 disposed about stud 58*b* which positions one point of the focus-winding structure at a fixed distance from the support thereof in the absence of temperature variations.

The focus-winding structures of the tubes supported by units 32 and 33 are positioned in a similar manner by means of elements 75*a*, 75*b*, 76*b* and 77*a*, 77*b*, 78*b*. Elements 76*b* and 78*b* comprise studs similar to stud 58*b* of the unit 34 and having spacers (not shown) disposed thereabout similar to the spacer 59, while elements 75*a*, 75*b* and 77*a*, 77*b* comprise adjustable screws similar to screws 59*a* and 59*b*. As may be seen by comparison of units 32, 33, 34, the nonadjustable element 78*b* and first adjustable element 77*a* for controlling the position of the component color image developed on the green cathode-ray tube supported by unit 33 along one direction of the scanning raster thereof have the same relative positions as corresponding elements 76*b*, 75*a* and 58*b*, 59*a* of the other two units. For example, an arrow pointing from stud 78*b* to screw 77*a* points in the same direction with respect to the scanning raster of unit 33 as an arrow pointing from stud 58*b* to screw 59*a* with respect to the scanning raster of unit 34 and in the same direction as an arrow pointing from stud 76*b* to screw 75*a* with respect to the scanning raster of unit 32.

The nonadjustable element 78*b* and a second adjustable element 77*b* for controlling the image position approximately along a normal direction of the scanning raster of the unit 33 have relative positions which are reversed with respect to corresponding elements 76*b*, 75*b* and 58*b*, 59*b* of the other two units 32, 34. For example, an arrow pointing from stud 78*b* to screw 77*b* points in the opposite direction with respect to the unit 33 as an arrow pointing from stud 58*b* to screw 59*b* with respect to the unit 34 and in the opposite direction from an arrow pointing from stud 76*b* to screw 75*b* with respect to the unit 32.

*Operation of Fig. 5b apparatus*

Referring for the moment to Fig. 3*b*, during normal operating temperature variations of the color-image-reproducing apparatus, there will ordinarily occur an expansion or contraction of the focus-winding structure 54 which causes the longitudinal axis of the winding structure to move toward or away from stud 58*a* in a plane including the axes of studs 58*a* and 58*b*. This is because the semispherical portion of spacer 59 and thus stud 58*b* preferably are tightly fitted transversely in the base plate 55 while the stud 58*a* preferably is more loosely fitted to allow transverse motion of the focus-winding structure with respect to the stud 58*a*. For example, during a temperature increase, the focus-winding structure 54 expands and the longitudinal axis thereof moves toward stud 58*a*.

In accordance with well-known principles of electron optics, the cathode-ray beam of a tube rotates as it traverses a magnetic focus field with the result that a displacement of the focus-winding axis in a given direction ordinarily causes image displacement on the cathode-ray tube face in a different direction determined by the cathode-ray beam rotation. For a cathode-ray tube structure of the type represented in Figs. 3*a* and 3*b* and assuming, for example, unity magnification ratio through the effective magnetic lens formed by the focus field of the cathode-ray tube, the image displacement differs in direction from the displacement of the focus-winding axis by half the angular rotation of the cathode-ray beam, which may be clockwise or counterclockwise as determined by the polarity of focus current flow.

Figure 5C:
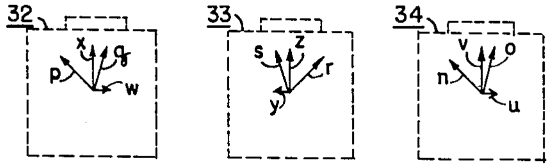
Figure 5D:
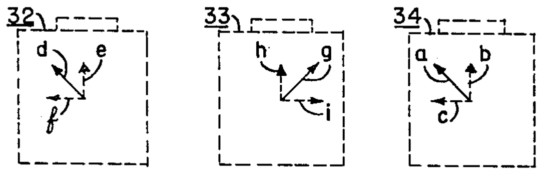
Figure 5E:
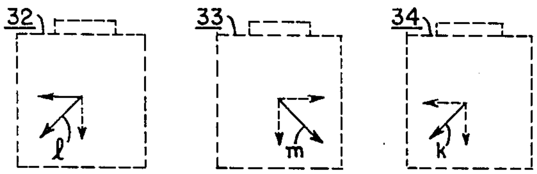

Referring now to Figs. 5*b* and 5*c*, it has been found that displacement of the longitudinal axis of the focus-winding structure supported by unit 34 due to thermal expansion away from stud 58*b*, that is, in the direction indicated by vector component *n*, causes displacement of the image developed on the face of the cathode-ray tube in a direction indicated by vector component *o*, as would be apparent to an observer of a rear face of the cathode-ray tube. The amplitudes of vector component *o* and other vector components have not been drawn to scale since they are intended primarily to represent angular relations. The vector component *o* may, for example, be displaced by approximately 49° in a clockwise sense from vector *n*, which angular displacement has been exaggerated in the drawing for clarity. The vector component *o* has components *u* and *v* in the direction of line scan and field scan, respectively.

Expansion of the focus-winding structure of the unit 32 and motion of the focus-winding axis in a direction indicated by vector component *p* results in image displacement on the cathode-ray tube face of unit 32 represented by vector component *q*. Vector component *q* has components *w* and *x* in the direction of line scan and field scan, respectively, of the cathode-ray device supported by unit 32. Thus, vector components *o* and *q* have components in the directions of line scan and field scan which have the same relative direction.

Because the focus-winding structure, including its mounting means, of unit 33 has a relative position with respect to unit 33 different from those of the focus-winding structures, including mounting means, of units 32 and 34, expansion of the focus-winding structure of unit 33 occurs in a direction indicated by vector component *r*. Since the focus field of the tube supported by unit 33 has a polarity opposite to the focus fields of the tubes supported by units 32 and 34, cathode-ray beam rotation through the focus winding is, for example, counterclockwise, that is, opposite to that of the beams of the cathode-ray tubes supported by units 32 and 34. Thus, the resultant image displacement on the cathode-ray tube face is in the direction represented by vector component *s*. Vector component *s* has components *y* and *z* in the direction of line scan and field scan, respectively.

As explained previously in connection with Fig. 4, the image translations accomplished by the optical units 32, 33, 34 and the dichroic mirrors 36, 37 are such that images disposed in the direction of field scan and having the same relative direction, for example, the tails of the arrows 72*r*, 72*g*, 72*b* are in register on the display screen 25. The optical units 32, 33, 34 and the dichroic mirrors 36, 37 translate image displacements in the direction of field scan in a similar manner. Thus, image displacements represented by vector components *x*, *z*, *v* are translated to the display screen as displacement components in the same direction.

As indicated by vector components *w*, *y*, *u*, image displacements in the direction of line scan caused by expansions of the focus-winding structures of units 32, 33, 34, respectively, have a sense which is the same as the sense of the line scan during visible trace time of the respective cathode-ray tubes. As explained previously in connection with Fig. 4, the image translations accomplished by the optical units 32, 33, 34 and the dichroic mirrors 36, 37 are such that images disposed in the direction of line scan and having relative directions indicated, for example, by the heads of arrows 72*r*, 72*g*, 72*b* and by arrows $L_r$, $L_g$, $L_b$ of Fig. 5*a* are in register on the display screen 25. The optical units 32, 33, 34 and the dichroic mirrors 36, 37 translate image displacements in a direction of line scan and having relative directions corresponding to arrows $L_r$, $L_g$, $L_b$ in a similar manner. Thus, although vector component *y* is in the opposite direction to vector components *u* and *w* of Fig. 5*c*, image displacements represented by vector components *w*, *y*, *u* are translated to the display screen as displacement components in the same direction. Accordingly, expansion of the focus-winding structures of the support units 32–34, inclusive, causes displacements of the red, green, and blue image components developed by the cathode-ray tubes in the same direction with respect to line-scan and field-scan directions thereof. Thus, temperature variations which affect the position of the longitudinal axes of the focus-winding structures cause the image components reproduced on the display screen to move in the same direction thereon, thereby substantially reducing degradation of the image register.

Referring briefly to Figs. 3*a* and 3*b*, during normal operating temperature variations of the color-image-reproducing apparatus, the adjustable screws 59*a* and 59*b* and the spacer 59 may expand or contract by different amounts because of the ordinarily different active lengths thereof. Because of the similar positioning of the cathode-ray tubes and the focus-winding structures on units 32 and 33, corresponding elements of those devices will ordinarily expand or contract by approximately the same amounts as the various elements of unit 34. Accordingly, by positioning the focus-winding structures on the individual cathode-ray units in accordance with the invention, the scanning rasters of the units are caused to shift in the same direction and by approximately the same amounts as projected on the display screen, thereby substantially reducing image-register degradation due to temperature variations.

In accordance with well-known principles of electron optics, it can be demonstrated that the rotation of an effective magnetic lens about an axis normal to its axis of symmetry causes an image displacement on the cathode-ray tube face related to the cathode-ray beam rotation as the beam traverses the lens and to the rotation of the lens in the manner described below. Referring now to Fig. 6*a*, there is diagrammatically represented in broken-line construction the cathode-ray tube 31 of the optical-support unit 34 of Figs. 3*a* and 3*b*. A set of coordinate axes 95, 96 of Fig. 6*a* may be considered as joining the screw 59*a*, stud 58*b*, and the screw 59*b* in the plane of the base plate 55 of the focus-winding structure 54, represented in Fig. 3*a*. The relative positions of the screws 59*a*, 59*b* and the stud 58*b* are indicated in Fig. 6*a* at the axis terminations.

When the cathode-ray beam rotation as the beam traverses the effective magnetic lens is in a clockwise direction as observed from a rear view of the cathode-ray tube face, the image displacement on the cathode-ray tube face caused by expansion or contraction of a given mounting element may be expressed in the following manner. Expansion of a given mounting element, for example, the screw 59*a*, may be considered as rotating the coordinate axes 95, 96 in a predetermined direction, for example, as indicated by arrow 97. Accordingly, as observed from the end of the coordinate axis 96 at the stud 58*b*, the rotation imparted to the axis 96 is in a counterclockwise direction as indicated by arrow 98. Thus, as observed from the end of the coordinate axis 96 at the screw 59*b*, the rotation of the axis 96 is in a clockwise direction.

A reference direction may then arbitrarily be considered to be direction of an arrow along the axis 96, pointing toward the end from which the rotation of the axis appears to be clockwise. For example, the reference direction is indicated by arrow 99 along axis 96 pointing toward end 59*b* thereof. Projecting arrow 99 to the cathode-ray tube face as a reference line, the image displacement caused by expansion of the screw 59*a* is in a direction, indicated by arrow 110, displaced from the reference line in a clockwise direction as observed from the rear of the cathode-ray tube by an angle $$\frac{\theta}{2}$$

for example, 49°. The angle $$\frac{\theta}{2}$$

is equal to one-half the rotation $\theta$ of the cathode-ray beam as it traverses the magnetic focusing field. Similarly, it may be shown that an expansion of the screw 59*b* causes an image displacement in the direction indicated by arrow 111 on the cathode-ray tube face. Thus, expansions of the screws *59a*, *59b* cause oblique image displacements approximately along the diagonals of the scanning raster and at right angles to each other.

The same principles may be employed to express the image displacement caused by expansion of given mounting elements when the rotation of the cathode-ray beam as it traverses the magnetic focusing field is counterclockwise when viewed from the rear of the cathode-ray tube, with the exceptions that the reference arrow, corresponding to arrow 99, points toward the end of the axis from which the rotation thereof appears to be counterclockwise and the image displacement on the cathode-ray tube face is in a direction indicated by an arrow displaced from the reference arrow in a counterclockwise direction when viewed from the rear of the cathode-ray tube by an angle equal to one-half the angle of the cathode-ray beam rotation.

Referring now to Fig. *5d* and assuming that during a temperature rise the adjustable screw 59*a* expands more than the spacer 59 disposed about the stud 58*b*, the expansion will cause a displacement of the image developed on the face of the cathode-ray tube represented by vector component *a* as would be apparent to an observer of the rear face of the cathode-ray tube. Vector component *a* has components *b* and *c* in a direction of field scan and line scan, respectively, and is at approximately a 49° angle relative to vector component *c*. Similarly, an expansion of adjustable screw 75*a* of the support unit 32 causes an image displacement on the cathode-ray tube face represented by vector component *d* having components *e* and *f* in the direction of field scan and line scan, respectively.

Since the focus current flow through the focusing winding of the green cathode-ray tube 30 supported by unit 33 has an opposite polarity to that of the other two tubes, the cathode-ray beam rotation as the beam traverses the focus field of tube 30 is counterclockwise, that is, opposite to the cathode-ray beam rotation effected by the focus fields of the red and blue cathode-ray tubes. Accordingly, for purposes of explanation, there are diagrammatically represented in Fig. *6b* the cathode-ray tube 30 supported by the optical unit 33 of Fig. *5b* and a set of coordinate axes 120, 121 indicated relative to the screws *77a*, *77b* and the stud *78b* in a manner similar to the representation of corresponding elements of the tube 31 supported by optical unit 34.

In acordance with principles previously explained, expansion of the screw *77a* may be considered as rotating the coordinate axes 120, 121 in the direction indicated, for example, by arrow 122. Thus, as observed from the end *77b* of the coordinate axis 121, the rotation imparted to the axis 121 is in a counterclockwise direction indicated by arrow 123. A reference direction may then be considered to be that indicated by arrow 124 along axis 121, pointing away from the end of the axis from which the rotation appears to be clockwise and toward the end of the axis from which the rotation appears to be counterclockwise. Projecting arrow 124 to the cathode-ray tube face as a reference line, the image displacement caused by expansion of the screw *77a* is in a direction indicated by arrow 125 displaced from the reference line 124 in a counterclockwise direction, as observed from the rear of the cathode-ray tube, by an angle $$\frac{\phi}{2}$$

for example, 49°. The angle $$\frac{\phi}{2}$$

is one-half the rotation of the cathode-ray beam as it traverses the magnetic focusing field of the tube 30. Similarly, it may be shown that an expansion of the screw *77b* causes an image displacement in the direction indicated by arrow 126 on the cathode-ray tube face.

Referring now to Fig. *5d* and assuming that, during a temperature rise, the adjustable screw *77a* expands more than the spacer disposed about the stud *78b*, that expansion would cause a displacement of the image developed on the cathode-ray tube represented by vector *g* corresponding to arrow 125 of Fig. *6b*, as would be apparent to an observer of the rear face of the cathode-ray tube. Vector component *g* has components *h* and *i* in the direction of field scan and line scan, respectively, and vector component *g* is at approximately a 49° angle relative to the vector component *i*. As indicated by vector components *b, e, h*, the displacement of the image components normal to the image lines thereof, that is, in the direction of field scan is effected in the same relative direction on the cathode-ray tubes by expansion of corresponding focus-winding mounting elements.

As explained previously in connection with Fig. 4, the image translations accomplished by the optical units 32, 33, 34 and the dichroic mirrors 36, 37 are such that images disposed in the direction of field scan and having the same relative direction, for example, the tails of the arrows *72r*, *72g*, *72b*, are in register on the display screen 25. The optical units 32, 33, 34 and the dichroic mirrors 36, 37 translate image displacements in the direction of field scan and having the same relative directions in a similar manner. Thus, image displacements represented by vector components *b, e,* and *h* are translated to the display screen as displacement components in the same direction.

As indicated by vector components *c, f, i*, image displacements in the direction of line scan caused by expansions of the mounting screws *59a*, *75a*, *77a*, respectively, have a sense opposite to the sense of the line scan during visible trace time of the respective cathode-ray tubes. As explained previously in connection with Fig. 4, the image translations accomplished by the optical units 32, 33, 34 and the dichroic mirrors 36, 37 are such that images disposed in the direction of line scan and having relative directions indicated, for example, by the heads of arrows *72r*, *72g*, *72b* and by arrows $L_r$, $L_g$, and $L_b$ of Fig. *5a* are in register on the display screen 25. The optical units 32, 33, 34 and the dichroic mirrors 36, 37 translate in a similar manner image displacements in the direction of line scan and having relative directions corresponding to or opposite to those indicated, for example, by arrows $L_r$, $L_g$, and $L_b$. Thus, although vector component *i* is in the opposite direction to vector components *c* and *f* of Fig. *5d*, image displacements represented by vector components *c, f,* and *i* are translated to the display screen as displacement components in the same direction.

By similar analysis, it may be shown that expansion of the adjustable screws *59b*, *75b*, and *77b* of the optical units 34, 32, 33, respectively, causes image displacements represented by arrows *k, l,* and *m* having components in the direction of line scan and field scan, as indicated in Fig. *5e*, which are translated to the display screen as displacement components in the same direction. Accordingly, temperature variations which affect the active lengths of the mounting elements cause the image components reproduced on the display screen to move in the same direction thereon, thereby substantially reducing degradation of the image register.

In the foregoing description, the motion of the focus winding with respect to its mounting studs has been considered as identical with motion of the focus winding with respect to the cathode-ray tube associated therewith. This is because the mounting studs remain substantially fixed laterally with respect to the cathode-ray tube notwithstanding temperature variations due to the large heat dissipation surface of the support to which the mounting studs are attached. It should be understood, however, that motion of the focus winding with respect to the cathode-ray tube determines the shift of the scanning raster and, thus, lateral motions of the mounting studs, or other motions which affect the position of the focus winding with respect to the cathode-ray tube, should be taken into account in positioning the focus windings and mounting elements in accordance with previously explained principles.

From the foregoing description, it will be apparent that the color-image-reproducing apparatus of the projection type constructed in accordance with the invention has the advantage that it is capable of substantially reducing degradation of the image register of the cathode-ray image-reproducing devices associated therewith notwithstanding normal temperature variations. Accordingly, the apparatus has the important advantage that it is suitable for use in a home color-television receiver.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a color-television receiver including circuit means for supplying signals representative of the intensities of predetermined primary colors of a color image to be reproduced, circuit means for supplying scanning signals, circuit means for supplying a beam-focus current, and an image-display screen, electromechanical color-image-reproducing apparatus of the projection type for displaying on the screen component color images and subject to temperature variations which tend to degrade the image register comprising: a supporting box; first, second, and third cathode-ray optical units mounted on said box and including a first electromagnetic beam-focus winding structure responsive to said beam-focus current for developing a first magnetic field of predetermined polarity and second and third electromagnetic beam-focus winding structures, respectively, responsive to said current for developing two similar beam-focus magnetic fields of opposite polarity to said first field and having groups of mounting elements, said cathode-ray units being responsive jointly to the color-representative signals and the scanning signals for developing and projecting component color images individually representative of predetermined primary colors of a color image to be reproduced; and a pair of intersecting plane dichroic mirrors disposed within said box for translating said component color images to the display screen in register; said beam-focus winding structures and said groups of mounting elements being subject to undesirable dimensional variations due to temperature variations of the apparatus and each group of said mounting elements comprising a nonadjustable element, a first adjustable element for controlling the position of the component color image developed by a cathode-ray unit along one direction of the scanning raster thereof, and a second adjustable element for controlling the image position along another direction of said scanning raster, said nonadjustable and second adjustable elements of said first cathode-ray unit having relative positions which are reversed with respect to corresponding elements of said second and third units for causing temperature variations to shift the scanning rasters of said units in the same direction as projected on the display screen, thereby substantially to reduce any image-register degradation on the display screen due to temperature variations.

2. In a color-television receiver including circuit means for supplying signals representative of predetermined primary colors of a color image to be reproduced, circuit means for supplying scanning signals, and an image-display screen, electromechanical color-image-reproducing apparatus of the projection type for displaying on the screen component color images and subject to temperature variations which tend to degrade the image register comprising: a support; a plurality of cathode-ray tube optical units mounted on said support and including a plurality of beam-control devices individual thereto, said units being responsive jointly to the color-representative signals and the scanning signals for developing and projecting component color images individually representative of predetermined primary colors of a color image to be reproduced; and optical means mounted on said support for translating said component color images to the display screen in register; said beam-control devices being subject to undesirable dimensional variations due to temperature variations of the apparatus and being so mounted on said cathode-ray units as to cause temperature variations to shift the scanning rasters of said units in the same direction as projected on the display screen, thereby substantially to reduce any image-register degradation on the screen due to temperature variations.

3. In a color-television receiver including circuit means for supplying signals representative of predetermined primary colors of a color image to be reproduced, circuit means for supplying scanning signals, and an image-display screen, electromechanical color-image-reproducing apparatus of the projection type for displaying on the screen component color images and subject to temperature variations which tend to degrade the image register comprising: a support; three cathode-ray tube optical units mounted on said support and including three beam-control devices individual thereto, said units being responsive jointly to the color-representative signals and the scanning signals for developing and projecting component color images individually representative of three predetermined primary colors of a color image to be reproduced; and optical means mounted on said support for translating said component color images to the display screen in register; said beam-control devices being subject to undesirable dimensional variations due to temperature variations of the apparatus and being so mounted on said cathode-ray units as to cause temperature variations to shift the scanning rasters of said units in the same direction as projected on the display screen, thereby substantially to reduce any image-register degradation on the screen due to temperature vairations.

4. In a color-television receiver including circuit means for supplying signals representative of predetermined primary colors of a color image to be reproduced, circuit means for supplying scanning signals, and an image-display screen, electromechanical color-image-reproducing apparatus of the projection type for displaying on the screen component color images and subject to temperature variations which tend to degrade the image register comprising: a support; a plurality of cathode-ray tube optical units mounted on said support and including a plurality of electromagnetic beam-focus winding structures individual thereto, said units being responsive jointly to the color-representative signals and the scanning signals for developing and projecting component color images individually representative of predetermined primary colors of a color image to be reproduced; and optical means mounted on said support for translating said component color images to the display screen in register;

said beam-focus winding structures being subject to undesirable dimensional variations due to temperature variations of the apparatus and being so mounted on said cathode-ray units as to cause temperature variations to shift the scanning rasters of said units in the same direction as projected on the screen, thereby substantially to reduce any image-register degradation on the screen due to temperature variations.

5. In a color-television receiver including circuit means for supplying signals representative of predetermined primary colors of a color image to be reproduced, circuit means for supplying scanning signals, and an image-display screen, electromechanical color-image-reproducing apparatus of the projection type for displaying on the screen component color images and subject to temperature variations which tend to degrade the image register comprising: a support; a plurality of cathode-ray tube optical units mounted on said support and including a plurality of beam-control devices individual thereto having mounting elements, said units being responsive jointly to the color-representative signals and the scanning signals for developing and projecting component color images individually representative of predetermined primary colors of a color image to be reproduced; and optical means mounted on said support for translating said component color images to the display screen in register; said beam-control devices being subject to undesirable dimensional variations due to temperature variations of the apparatus and said mounting elements comprising groups of studs having differing active lengths and being so positioned on said cathode-ray units as to cause temperature variations to shift the scanning rasters of said units in the same direction as projected on the display screen, thereby substantially to reduce any image-register degradation on the screen due to temperature variations.

6. In a color-television receiver including circuit means for supplying signals representative of predetermined primary colors of a color image to be reproduced, circuit means for supplying scanning signals, and an image-display screen, electromechanical color-image-reproducing apparatus of the projection type for displaying on the screen component color images and subject to temperature variations which tend to degrade the image register comprising: a support; a plurality of cathode-ray tube optical units mounted on said support and including a plurality of beam-control devices individual thereto having mounting elements, said units being responsive jointly to the color-representative signals and the scanning signals for developing and projecting component color images individually representative of predetermined primary colors of a color image to be reproduced; and optical means mounted on said support for translating said component color images to the display screen in register; said beam-control devices being subject to undesirable dimensional variations due to temperature variations of the apparatus and said mounting elements being constructed of the same material to impart thereto the same temperature coefficient of expansion and being so positioned on said cathode-ray units as to cause temperature variations to shift the scanning rasters of said units in the same direction as projected on the display screen, thereby substantially to reduce any image-register degradation on the screen due to temperature variations.

7. In a color-television receiver including circuit means for supplying signals representative of predetermined primary colors of a color image to be reproduced, circuit means for supplying scanning signals, and an image-display screen, electromechanical color-image-reproducing apparatus of the projection type for displaying on the screen component color images and subject to temperature variations which tend to degrade the image register comprising: a support; a plurality of cathode-ray tube optical units mounted on said support and including a plurality of beam-control devices individual thereto having groups of three mounting elements, said units being responsive jointly to the color-representative signals and the scanning signals for developing and projecting component color images individually representative of predetermined primary colors of a color image to be reproduced; and optical means mounted on said support for translating said component color images to the display screen in register; said beam-control devices being subject to undesirable dimensional variations due to temperature variations of the apparatus and each group of said mounting elements being disposed at the vertices of a triangle and two of said elements of each group being adjustable for adjusting a beam-control device with respect to a cathode-ray unit to position the image developed thereby, said mounting elements being so positioned on said cathode-ray units as to cause temperature variations to shift the scanning rasters of said units in the same direction as projected on the display screen, thereby substantially to reduce any image-register degradation on the screen due to temperature variations.

8. In a color-television receiver including circuit means for supplying signals representative of predetermined primary colors of a color image to be reproduced, circuit means for supplying scanning signals, and an image-display screen, electromechanical color-image-reproducing apparatus of the projection type for displaying on the screen component color images and subject to temperature variations which tend to degrade the image register comprising: a support; a plurality of cathode-ray tube optical units mounted on said support and including a plurality of beam-control devices individual thereto having groups of three mounting elements, said units being responsive jointly to the color-representative signals and the scanning signals for developing and projecting component color images individually representative of predetermined primary colors of a color image to be reproduced; and optical means mounted on said support for translating said component color images to the display screen in register; said beam-control devices being subject to undesirable dimensional variations of the apparatus and each group of said mounting elements including a non-adjustable element disposed at the right-angle vertex of a right triangle and a pair of adjustable elements disposed at the other vertices for individually adjusting the image position along directions normal to each other on the scanning raster, said mounting elements being so positioned on said cathode-ray units as to cause temperature variations to shift the scanning rasters of said units in the same direction as projected on the display screen, thereby substantially to reduce any image-register degradation on the screen due to temperature variations.

9. In a color-television receiver including circuit means for supplying signals representative of predetermined primary colors of a color image to be reproduced, circuit means for supplying scanning signals, and an image-display screen, electromechanical color-image-reproducing apparatus of the projection type for displaying on the screen component color images and subject to temperature variations which tend to degrade the image register comprising: a support; a plurality of cathode-ray tube optical units mounted on said support and including a plurality of beam-control devices individual thereto and including a plurality of optical lens means individual thereto, said units being responsive jointly to the color-representative signals and the scanning signals for developing and projecting component color images individually representative of predetermined primary colors of a color image to be reproduced; and optical means mounted on said support and comprising dichroic mirror means for translating said component color images to the display screen in register; said beam-control devices being subject to undesirable dimensional variations due to temperature variations of the apparatus and being so mounted on said cathode-ray units as to cause temperature variations to shift the scanning rasters of said units in the same direction as projected on the display screen, thereby substantially to reduce any image-register degradation on the screen due to temperature variations.

10. In a color-television receiver including circuit means for supplying signals representative of predetermined primary colors of a color image to be reproduced, circuit means for supplying scanning signals, and an image-display screen, electromechanical color-image-reproducing apparatus of the projection type for displaying on the screen component color images and subject to temperature variations which tend to degrade the image register comprising: a supporting box in the form of a hollow right parallelepiped; three cathode-ray tube optical units mounted on three faces of said box and including three beam-control devices individual thereto having mounting elements, said units being responsive jointly to the color-representative signals and the scanning signals for developing and projecting component color images individually representative of predetermined primary colors of a color image to be reproduced; and a pair of intersecting plane dichroic mirrors disposed perpendicular to each other within said box and having substantially a 45° angular relation wtih respect to the directions of light propagation thereto from said cathode-ray units for translating said component color images to the display screen in register; said beam-control devices being subject to undesirable dimensional variations due to temperature variations of the apparatus and said mounting elements being so positioned on said cathode-ray units as to cause temperature variations to shift the scanning rasters of said units in the same direction as projected on the display screen, thereby substantially to reduce any image-register degradation on the screen due to temperature variations.

11. In a color-television receiver including circuit means for supplying signals representative of predetermined primary colors of a color image to be reproduced, circuit means for supplying scanning signals, and an image-display screen, electromechanical color-image-reproducing apparatus of the projection type for displaying on the screen component color images and subject to temperature variations which tend to degrade the image register comprising: a supporting box of rectangular cross section having elongated faces and an image-projection aperture in one of said faces; three elongated cathode-ray tube optical units supported from three elongated faces of said box with longitudinal cathode-ray tube axes parallel to each other and including three beam-control devices individual thereto, said units being responsive jointly to the color-representative signals and the scanning signals for developing and projecting component color images individually representative of predetermined primary colors of a color image to be reproduced; and a pair of intersecting plane dichroic mirrors disposed perpendicular to each other within said box and having an axis of intersection substantially parallel to said axes of said cathode-ray tube units for translating said component color images through said aperture of said box to the display screen in register; said beam-control devices being subject to undesirable dimensional variations due to temperature variations of the apparatus and being so mounted on said cathode-ray units as to cause temperature variations to shift the scanning rasters of said units in the same direction as projected on the display screen, thereby substantially to reduce any image-register degradation on the screen due to temperature variations.

12. In a color-television receiver including circuit means for supplying signals representative of predetermined primary colors of a color image to be reproduced, circuit means for supplying scanning signals, circuit means for supplying a beam-focus current, and an image-display screen, electromechanical color-image-reproducing apparatus of the projection type for displaying on the screen component color images and subject to temperature variations which tend to degrade the image register comprising: a support; first, second, and third cathode-ray tube optical units mounted on said support and including a first electromagnetic beam-focus winding structure responsive to said beam-focus current for developing a first magnetic field of predetermined polarity and second and third electromagnetic beam-focus winding structures, respectively, responsive to said current for developing two similar beam-focus magnetic fields of opposite polarity to said first field and having groups of mounting elements, said cathode-ray units being responsive jointly to the color-representative signals and the scanning signals for developing and projecting component color images individually representative of predetermined primary colors of a color image to be reproduced; and optical means mounted on said support for translating said component color images to the display screen in register; said beam-focus winding structures being subject to undesirable dimensional variations due to temperature variations of the apparatus and being so mounted on said cathode-ray units as to cause temperature variations to shift the scanning rasters of said units in the same direction as projected on the display screen, thereby substantially to reduce any image-register degradation on the screen due to temperature variations.

13. In a color-television receiver including circuit means for supplying signals representative of predetermined primary colors of a color image to be reproduced, circuit means for supplying scanning signals, circuit means for supplying a beam-focus current, and an image-display screen, electromechanical color-image-reproducing apparatus of the projection type for displaying on the screen component color images and subject to temperature variations which tend to degrade the image register comprising: a support; first, second, and third cathode-ray tube optical units mounted on said support and including a first electromagnetic beam-focus winding structure responsive to said beam-focus current for developing a first magnetic field of predetermined polarity and second and third electromagnetic beam-focus winding structures, respectively, responsive to said current for developing two similar beam-focus magnetic fields of opposite polarity to said first field and having groups of mounting elements, said beam-focus winding structures including magnetic shunts having the same temperature coefficient of expansion for maintaining similar magnetic beam-focus fields for said units notwithstanding temperature variations of the apparatus, and said cathode-ray units being responsive jointly to the color-representative signals and the scanning signals for developing and projecting component color images individually representative of predetermined primary colors of a color image to be reproduced; and optical means mounted on said support for translating said component color images to the display screen in register; said beam-focus winding structures being subject to undesirable dimensional variations due to temperature variations of the apparatus and being so mounted on said cathode-ray units as to cause temperature variations to shift the scanning rasters of said units in the same direction as projected on the display screen, thereby substantially to reduce any image-register degradation on the screen due to temperature variations.

14. In a color-television receiver including circuit means for supplying signals representative of predetermined primary colors of a color image to be reproduced, circuit means for supplying scanning signals, circuit means for supplying a beam-focus current, and an image-display screen, electromechanical color-image-reproducing apparatus of the projection type for displaying on the screen component color images and subject to temperature variations which tend to degrade the image register comprising: a support; a plurality of cathode-ray tube optical units mounted on said support and including a plurality of beam-control devices individual thereto having groups of mounting elements, said units being responsive jointly to the color-representative signals and the scanning signals for developing and projecting component color images individually representative of predetermined primary colors of a color image to be reproduced; and optical means mounted on said support for translating said component color images to the display screen in register; said beam-control devices being subject to undesirable dimensional variations due to temperature variations of the apparatus and each group of said mounting elements comprising a nonadjustable element, a first adjustable element for controlling the position of the component color image developed by a cathode-ray unit along one direction of the scanning raster and a second adjustable element for controlling the image position along another direction of said raster, said nonadjustable and second adjustable elements of said first cathode-ray unit having relative positions which are reversed with respect to corresponding elements of said second and third units for causing temperature variations to shift the scanning rasters of said units in the same direction as projected on the display screen, thereby substantially to reduce any image-register degradation on the screen due to temperature variations.

15. In a color-television receiver including circuit means for supplying signals representative of predetermined primary colors of a color image to be reproduced, circuit means for supplying scanning signals, circuit means for supplying a beam-focus current, and an image-display screen, electromechanical color-image-reproducing apparatus of the projection type for displaying on the screen component color images and subject to temperature variations which tend to degrade the image register comprising: a support; a plurality of cathode-ray tube optical units mounted on said support and including a plurality of beam-control devices individual thereto having groups of mounting elements, said units being responsive jointly to the color-representative signals and the scanning signals for developing and projecting component color images individually representative of predetermined primary colors of a color image to be reproduced; and optical means mounted on said support for translating said component color images to the display screen in register; said groups of mounting elements being subject to undesirable dimensional variations due to temperature variations of the apparatus and each group of said mounting elements comprising a nonadjustable element, a first adjustable element for controlling the position of the component color image developed by a cathode-ray unit along one direction of the scanning raster and a second adjustable element for controlling the image position along another direction of said raster, said nonadjustable and second adjustable elements of said first cathode-ray unit having relative positions which are reversed with respect to corresponding elements of said second and third units for causing temperature variations to shift the scanning rasters of said units in the same direction as projected on the display screen, thereby substantially to reduce any image-register degradation on the screen due to temperature variations.

16. In a color-television receiver including circuit means for supplying signals representative of predetermined primary colors of a color image to be reproduced, circuit means for supplying scanning signals, circuit means for supplying a beam-focus current, and an image-display screen, electromechanical color-image-reproducing apparatus of the projection type for displaying on the screen component color images and subject to temperature variations which tend to degrade the image register comprising: a support; a plurality of cathode-ray tube optical units mounted on said support and including a plurality of beam-focus winding structures individual thereto having groups of mounting elements, said units being responsive jointly to the color-representative signals and the scanning signals for developing and projecting component color images individually representative of predetermined primary colors of a color image to be reproduced; and optical means mounted on said support for translating said component color images to the display screen in register; said beam-focus winding structures being subject to undesirable dimensional variations due to temperature variations of the apparatus and each group of said mounting elements comprising a nonadjustable element, a first adjustable element for controlling the position of the component color image developed by a cathode-ray unit along one direction of the scanning raster and a second adjustable element for controlling the image position along another direction of said raster, said nonadjustable and second adjustable elements of said first cathode-ray unit having relative positions which are reversed with respect to corresponding elements of said second and third units for causing temperature variations to shift the scanning rasters of said units in the same direction as projected on the display screen, thereby substantially to reduce any image-register degradation on the screen due to temperature variations.

17. In a color-television receiver including circuit means for supplying signals representative of predetermined primary colors of a color image to be reproduced, circuit means for supplying scanning signals, circuit means for supplying a beam-focus current, and an image-display screen, electromechanical color-image-reproducing apparatus of the projection type for displaying on the screen component color images and subject to temperature variations which tend to degrade the image register comprising: a support; a plurality of cathode-ray tube optical units mounted on said support and including a plurality of beam-focus winding structures individual thereto having groups of mounting elements, said units being responsive jointly to the color-representative signals and the scanning signals for developing and projecting component color images individually representative of predetermined primary colors of a color image to be reproduced; and optical means mounted on said support for translating said component color images to the display screen in register; said beam-focus winding structures and said groups of mounting elements being subject to undesirable dimensional variations due to temperature variations of the apparatus and each group of said mounting elements comprising a nonadjustable element, a first adjustable element for controlling the position of the component color image developed by a cathode-ray unit along one direction of the scanning raster and a second adjustable element for controlling the image position along another direction of said raster, said nonadjustable and second adjustable elements of said first cathode-ray unit having relative positions which are reversed with respect to corresponding elements of said second and third units for causing temperature variations to shift the scanning rasters of said units in the same direction as projected on the display screen, thereby substantially to reduce any image-register degradation on the screen due to temperature variations.

References Cited in the file of this patent

UNITED STATES PATENTS

| | | |
|---|---|---|
| 2,568,543 | Goldsmith | Sept. 18, 1951 |
| 2,594,382 | Bedford | Apr. 29, 1952 |
| 2,594,383 | Bedford | Apr. 29, 1952 |
| 2,660,612 | Wood | Nov. 24, 1953 |